INVENTOR.
RAINER ZULEEG,
BY
ATTORNEY.

United States Patent Office 3,409,812
Patented Nov. 5, 1968

3,409,812
SPACE-CHARGE-LIMITED CURRENT
TRIODE DEVICE
Rainer Zuleeg, Newport Beach, Calif., assignor to Hughes Aircraft Company, Culver City, Calif., a corporation of Delaware
Continuation-in-part of application Ser. No. 507,337, Nov. 12, 1965. This application July 11, 1966, Ser. No. 575,480
7 Claims. (Cl. 317—235)

ABSTRACT OF THE DISCLOSURE

A space-charge-limited current triode comprising a contorl layer or grid of substantially intrinsic semiconductor material embedded in a semiconductor body so as to separate it into two high-resistivity regions.

This is a continuation-in-part of application Ser. No. 507,337 filed Nov. 12, 1965, now abandoned, by the same inventor and assigned to the instant assignee.

This invention relates to novel solid-state electronic devices and to methods for fabricating such devices. More particularly, the invention relates to space-charge-limited current solid-state active devices useful as rectifiers and amplifiers. As used herein, the term "active device" means any solid-state electronic device which can alter one or more characteristics of an electrical signal applied thereto in a controllable and reproducible fashion in contrast to a "passive device" which does not controllably alter the characteristics of an electrical signal applied thereto or transmitted thereby.

Active semiconductor devices, sometimes called "unipolar" or "analog" transistors, operating by means of electrical fields estabilshed in a solid state body, are known. W. Shockley describes such analog and unipolar devices in an article entitled, "Transistor Electronics: Imperfections, Unipolar and Analog Transistors," published in the November 1952 Proceedings of the IRE (vol. 40, No. 11) at page 1289 and especially at page 1311. Because of the techniques for forming such devices and because of their extremely small dimensions, the fabrication of complete solid-state circuits, including passive as well as active functions, has become of increasing importance and has given rise to a whole new art called, variously, solid circuitry, micro-circuitry, integrated circuitry, or microelectronics. Such circuitry is possible because of the ability to form regions having different electrical properties by vapor-deposition, masking and solid-state diffusion techniques which regions are capable of operating in a controllable manner to provide such functions as rectification, amplification, resistance, capacitance and inductance, in a single integrated structure. Thus amplification can be provided by vapor-depositing a metallic electrode, which may be called a "source," upon a substrate and then depositing a layer of a semi-insulator material upon the "source" electrode. A "drain" or collector electrode is then formed by depositing a thin metallic film on the semi-insulator body. Likewise, my masking and vapor-deposition techniques, an apertured "gate" or control electrode in the form of a grid, for example, may be disposed in the semi-insulator body between the source and drain electrode films. Thus the flow of majority charge carriers from the source to the drain electrode through the semi-insulator body may be controlled by the field therein established by a signal on the gate electrode. Such devices are closely analogous to vacuum tube devices (hence the term "analog" transistors) except that in these field effect devices the charge carriers flow from cathode (source) to anode (drain) in a solid medium generally called a semi-insulator or semiconductor. In order to provide a convenient distinction between such field effect unipolar or anolog devices and the devices to which the present invention relates, the devices of the present invention are referred to herein as space-charge-limited current triodes.

In the co-pending application of R. Zuleeg, S.N. 333,-127 filed December 24, 1963, now abandoned, and assigned to the instant assignee, a field effect triode device is described which comprises a grid of P-type material, for example, embedded in a body of N-type silicon which grid serves as the "gate" electrode between the "source" and "drain" electrodes which, in one embodiment, are constituted by metallic films disposed on opposite surfaces of the silicon body. In this device, the current flows from the source electrode to the drain electrode by means of ionized impurities contained in a body of semi-insulator material. Such current flow is controlled by impressing an appropriate signal on the P-type grid gate which signal establishes an electric field around the grid so as to effectively suppress or close off the flow of majority charge carriers through the interstices of the grid from the source to the drain electrodes.

In the space-charge-limited current devices of the present invention, a region of high resistivity material of one type of conductivity (i.e., P-type) is sandwiched between adjacent regions of high resistivity material of opposite conductivity (i.e., N-type) in a semiconductor body between the source and drain electrodes which may be of low resistivity N-type material, for example.

Such a N+NPNN+ structure can be used as a solid state space-charge-limited diode, e.g., a two-terminal network. At a certain applied voltage, the space-charge or depletion region will punch through the high resistivity P or intrinisic region and reach the side of one of the N layers (i.e., the drain). A further increase of the voltage will allow space-charge-limited current to flow through this region. A reverse bias applied to the other PN-junction (namely, gate to source) will widen the depletion region through which space-charge-limited current passes and this widening depresses the current flow from source to drain. Thus the width of the effective total depletion or space-charge region modulates the current flowing therethrough in accordance with signals applied to the gate as will be explained in greater detail hereinafter.

It is therefore an object of the present invention to provide an improved solid-state electrical device.

Another object of the invetnion is to provide an improved solid-state space-charge-limited current triode device.

Another object of the invention is to provide an improved solid-state triode device having a gate electrode region of intrinsic material to establish a space charge region which may be controllably expanded in order to depress or cut off the current flowing therethrough.

Yet another object of the invention is to provide an improved solid-state space-charge-limited current triode device for use in micro-electronic integrated circuitry which can be fabricated as an integral part of such cir- cuitry, and which device has the means for modifying the current flow between its input and output electrodes.

These and other objects and advantages of the invention are attained by providing a layer or region of high re- sistivity or intrinsic semiconductor material of one type of conductivity in a body of semiconductor material and between adjacent regions of the semiconductor body of high resistivity material of the opposite type of conductivity. The term "intrinsic" as used herein means a region of semiconductor material which contains a minimum number of mobile charge carriers available for current conduction in the specific semiconductor material. Such intrinsic properties may be realized in semiconductor material which contains either no conductivity type-determining impurities or in which such impurities of opposite conducting types are balanced or compensate each other. In a typical embodiment, the high resistivity N-type semiconductor regions may be disposed adjacent regions of low (N+) resistivity or a pair of electrically conductive members constituting the source and drain electrodes of the device. While the intrinsic region of semiconductor material may be embedded between high resistivity regions of opposite conductivity which are formed in separate stages in fabrication, these high resistivity regions may coalesce so as to provide an apparent single region in which the intrinsic region is embedded.

The invention will be described in greater detail by reference to the drawings in which.

In connection with the triode devices according to the present invention, the term "semiconductor" refers to and means semi-insulator and other materials such as silicon and germanium which at room temperature have a low intrinsic majority carrier concentration so that at room temperature the material exhibits low electrical conductivity. Other typically suitable materials are compounds of the elements from the Third with elements from the Fifth Columns of the Periodic Table of the Elements such as: aluminum phosphide, aluminum arsenide, aluminum antimonide, gallium phosphide, gallium arsenide and indium phosphide. While any of the aforementioned materials may be used to advantage in the practice of the invention, description herein will be confined primarily to the use of silicon as an exemplary material.

Figure 1:
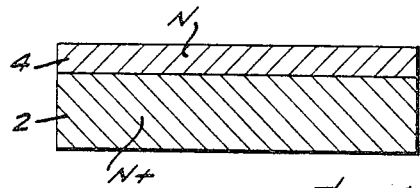
FIGURE 1 is a cross-sectional elevational view of a space-charge-limited current triode device according to the invention in an initial stage of fabrication thereof.

As shown in FIGURE 1, a substrate member 2 of high conductivity N-type silicon, for example, is provided for supporting the space-charge-limited current (hereinafter abbreviated to "SCLC") triode device to be fabricated. Although such a device may comprise a body of semi-insulator material sandwiched between metallic layers which may serve as source and drain electrodes, it is not essential that these electrodes be metallic. As taught in the aforementioned co-pending application of R. Zuleeg (S.N. 333,127, filed Dec. 24, 1963), the source and/or drain electrodes may be formed of highly conductive semiconductor material. Hence the high conductivity N-type silicon substrate member 2 may serve as a source electrode, for example. Hereinafter, when referring to high conductivity semiconductor regions, the conductivity type designation (N or P) of the region will be combined with a "+" to designate high conductivity.

Because of the great difficulty in vapor-depositing silicon upon substrate surfaces of materials other than silicon itself, the fabrication of an SCLC triode device utilizing silicon as the semiconductor material is facilitated by the employment of a substrate of silicon. Thus, since silicon may be conveniently deposited upon silicon, it is desirable to utilize a combined substrate-source electrode 2 of silicon which has been heavily doped so as to be an effective electrical conductor. It is known that by heavy doping of a semiconductor body, such body can be converted to degenerative semiconductor material which means that the body has such a concentration of impurity therein as to cause it to lose its semiconducting characteristics and to behave as a more conventional electrical conductor. The silicon material for constituting the device body 4 may then be deposited upon the degeneratively-doped silicon substrate 2.

To achieve the arrangement shown in FIGURE 1, several methods of fabrication are available. A body of semiconductor material having the resistivity desired for the SCLC triode device may be initially provided. By diffusion, one portion of the body may be doped to degeneracy to thus form a source electrode member and substrate 2 while leaving the opposite surface portion unchanged in resistivity so as to constitute a first device body portion 4 as shown. Alternatively, a substrate and source electrode member 2 of high conductivity semiconductor material may be initially provided and, as will be described in greater detail hereinafter, by an epitaxial process the device body portion 4 may be formed on the substrate-electrode 2.

For convenience, and solely for purposes of illustration, the device semiconductor body in this embodiment of the invention may be referred to as being of N-type conductivity due to an excess of majority charge carriers (i.e., electrons) therein. The gate electrode member 6 may be referred to as being of P-type conductivity due to a deficiency of majority charge carriers (i.e., electrons) therein. It will be understood that such conductivity conditions are usually established by the incorporation of certain impurity elements into the bulk semiconductor material. Thus silicon, for example, may have any one of such impurity elements as arsenic, antimony or phosphorous incorporated therein to establish N-type conductivity since these elements contribute an excess of electrons to the silicon for current conduction. P-type silicon may have any one of such impurity elements as aluminum, boron or indium incorporated therein to establish P-type conductivity since these elements lack an excess of electrons while providing an excess of "holes" for current conduction. When a region of a semiconductor body contains both N- and P-type impurities so that there is a substantial balance of the two impurities, the region may be termed "intrinsic" and electrically behaves as an insulator since there are neither sufficient electrons or "holes" available for current conduction. Such a balance is also called compensation because the electrons available from the N-type impurity atoms are compensated for and taken up, as it were, by a substantially equal number of holes available from the P-type impurity. The process of incorporating such impurity elements into the crystal lattice structure of semiconductor materials is well known and is commonly referred to as "doping" and may be achieved by diffusing or alloying the impurity into the semiconductor body or by including such impurity in the melt from which the semiconductor crystal body is grown.

According to the invention, the gate electrode member 6 may be of semiconductor material and, as has been mentioned previously, of the same material as the semi-insulator body 4 although of different or opposite conductivity type. Thus, if, as described, the semiconductor body 4 is of N-type conductivity, the gate electrode member 6 may be of P-type conductivity.

Figure 2:
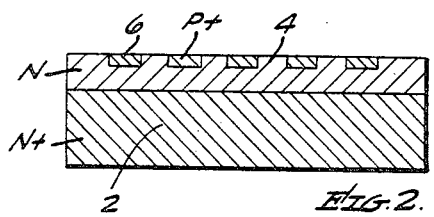
FIGURE 2 is a cross-sectional elevational view of the space-charge-limited current triode shown in FIGURE 1 at a subsequent stage in the fabrication thereof.
Figure 3:
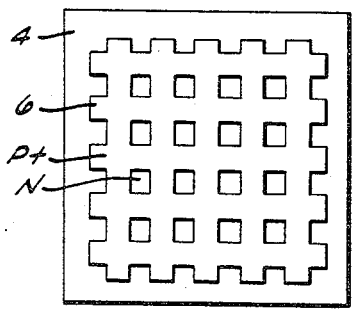
FIGURE 3 is a plan view of the field effect triode device shown in FIGURE 2.

Referring now to the drawings and especially to FIGURES 2 and 3, the fabrication of a triode device according to the invention having an intrinsic gate electrode 6 may be achieved by diffusing an acceptor conductivity type-determining impurity through a suitable mask upon the surface of the N-type layer 4. The mask may be formed by oxidizing the surface of the silicon layer 4, then removing portions of the oxide corresponding to the dimensions and pattern of the grid to be formed. The formation of such an oxide mask may be achieved by photo-resist and etching techniques as is well known in the art. Diffusion of the acceptor impurity is then achieved so as to form a grid 6 of heavily P-type doped silicon material in the N-type silicon layer 4. Thereafter, the oxide mask is entirely removed leaving the structure shown in FIGURES 2 and 3. These oxides masking and diffusion techniques are well known in the art and reference is made to United States Patents, No. 2,802,760 to Derick and Frosch and No. 3,025,589 to Hoerni for a complete detailed description thereof.

Figure 4:
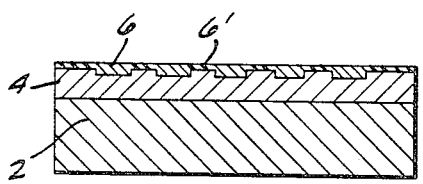
FIGURE 4 is a cross-sectional elevational view of the space-charge-limited current triode device shown in FIGURES 2 and 3 at a further subsequent stage in the fabrication thereof.
Figure 5:
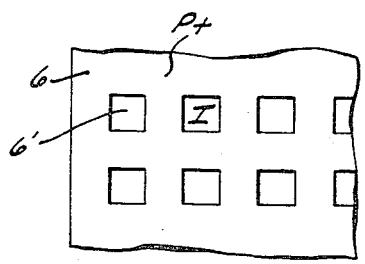
FIGURE 5 is a plan view of the space-charge-limited current triode device shown in FIGURE 4.

At this point, the non-exposed surface of the semiconductor region 4 is subjected to an etching treatment at a high temperature which results in a plurality of thin regions 6' or islands in the N-type material 4 being doped with atoms from the heavily doped P+ diffused regions 6 so as to compensate for the N-type doping of these island portions 6' which are thus converted to regions of intrinsic conductivity as shown in FIGURES 4 and 5. A suitable etchant for this purpose may be hydrochloric acid, for example. The surface of the semiconductor region may be subjected to this etchant for about two to ten minutes at a temperature of 1000–1200° C. depending upon the N-type impurity concentration of the N-type region 4. The final result is the formation of a number of intrinsic regions or islands 6' disposed in the heavily doped P+ surface 6 of the semiconductor body as shown in FIGURES 4 and 5, and it is through these intrinsic regions 6' that current from the source to the drain electrodes is intended to flow.

Figure 6:
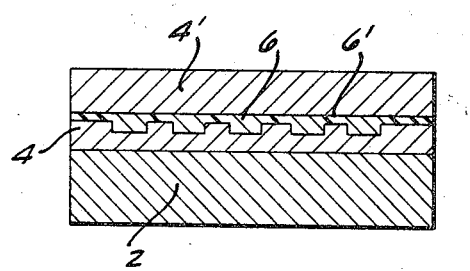
FIGURE 6 is a cross-sectional view in elevation of the space-charge-limited current triode device shown in FIGURES 4 and 5 at a further stage in the fabrication thereof.

A layer 4' of high resistivity N-type silicon may then be epitaxially deposited upon the entire surface of the N-type body portion 4 including the P+ surface portions 6 and the intrinsic islands 6' thereof as shown in FIGURE 6. While the high resistivity regions or layers 4, 4' are shown in the drawings as separate or discrete, the epitaxial formation of the N-type layer 4' results in this layer being a crystalline extension of the crystalline lattice structure of the N-type layer 4 so that in reality these two regions 4 and 4' coalesce and appear as a single region. In this process, the silicon may be formed by the epitaxial process and caused to deposit upon the N-type body portion 4 by the simultaneous reduction in hydrogen of phosphorous trichloride and silicon tetrachloride at a temperature of from 1200° to 1300° C. The epitaxial process is well known and fully described by H. C. Theuerer in the Journal of the Electrochemical Society (1961—vol. 108 at page 649) and by A. Mark in the same Journal (1961—vol. 108 at page 880).

Figure 7:
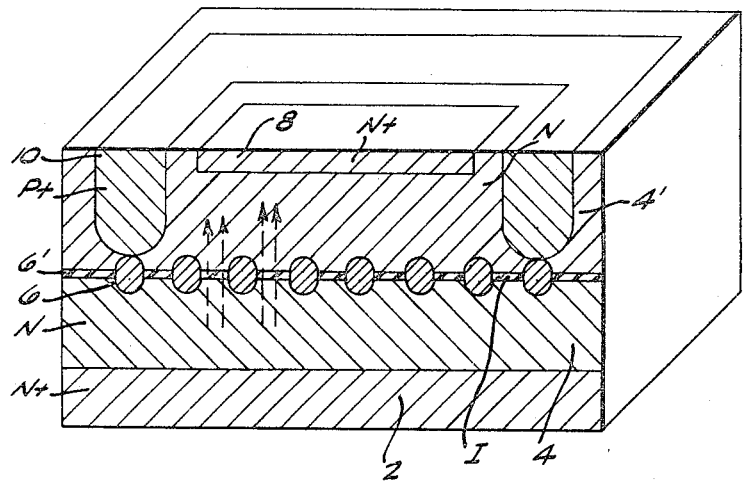
FIGURE 7 is a perspective view partly in section of a planar-type space-charge-limited current triode device according to the invention.

During this deposition process, the high temperatures to which the assembly is maintained (i.e., 1100° C.) causes atoms from the heavily doped P+ regions 6 to diffuse further into the N-type region 4 and into the epitaxially deposited N-type layer 4' so that the gate electrode resembles a plurality of thick or bulged-out P+ regions 6 connected by a thin layer 6' of intrinsic material as shown in FIGURE 7.

Figure 8:
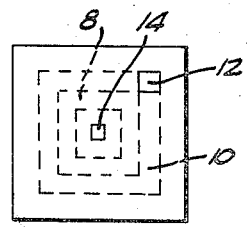
FIGURE 8 is a plan view of the space-charge-limited current triode device shown in FIGURE 7.

Thereafter, and with special reference to FIGURES 7 and 8, the upper surface of the N-type layer 4' may be masked as by oxidizing this surface and then removing a loop or ring of the oxide of a diameter sufficient to encompass or surround the underlying gate electrode 6, 6'. The assembly is then exposed to an atmosphere containing the vapors of a P-type conductivity type-determining impurity, such as boron, for example, which impurity diffuses into the exposed N-type silicon surface through the annular opening in the oxide mask. This diffusion converts an annular portion 10 of surface and near-surface regions of the exposed silicon to P-type conductivity so that this P+ annular region 10 extends down into the semiconductor body and electrically contacts the gate electrode 6, 6'. Thereafter, the annular opening through the oxide layer on the upper surface of the semiconductor body may be closed or sealed off to the atmosphere by re-oxidizing the exposed portions thereof.

The drain electrode layer or member 8 may then be formed by removing a portion of the oxide mask and diffusing into the exposed portion of the N-type layer 4' a donor impurity such as arsenic thus forming the layer 8 of high conductivity material therein as shown in FIGURE 7. The surface of the drain region 8 may then be re-oxidized.

After the drain diffusion and oxidation steps have been completed, portions of the oxide film may be removed as by etching the same with hydrofluoric acid so as to provide exposed areas of the drain electrode layer 8 and the annular gate contact region 10 into which areas electrical connections 12 and 14 may be made by depositing metal thereinto as indicated in FIGURE 8. Alternatively, wires may be inserted into these openings and fused to the gate contact ring 10 and the drain region 8. It will be understood that, except for the electrical connections 12 and 14, the entire upper surface of the device is protected by an oxide layer 16.

The complete device is shown in FIGURES 7 and 8 and includes: (1) a drain electrode member 8 comprising a layer of N+ silicon; (2) a source electrode member 2 comprising also a layer of N+ silicon; (3) a semiconductor body 4, 4' of high resistivity N-type silicon in which is embedded an intrinsic gate electrode member 6, 6'; and (4) a P+ region 10 electrically contacting the member gate 6, 6'. In this device, the current flowing from the source electrode layer 2 to the drain electrode layer 8 through the N-type silicon material 4 and 4' and the intrinsic regions 6' of the gate member 6, 6' may be controlled by impressing any desired signal through the gate contact region 10 to the gate member 6, 6'. An appropriate voltage signal on the gate member 6, 6' causes the space-charge or depletion region associated with the intrinsic portions 6' of the gate member 6, 6' to widen. Hence, the areas 6' of intrinsic material for the flow of space-charge-limited current therethrough are of electrically variable and controllable width thus permitting one to effectively regulate and suppress or "pinch off" the flow of such current as desired.

In a typical device which was constructed and operated in accordance with the present invention, the source-substrate member 2 was about 10 mils in thickness and of N-type silicon having a resistivity of from 0.001 to 0.01 ohm/cm. The high resistivity semiconductor body 4, 4' was of N-type silicon having a resistivity of about 2 ohm/cm., for example, with the body portions 4, 4' each being about 10 microns thick. The gate member 6, 6' was of P-type silicon with the thicker portions 6 being about 5 to 8 microns thick and having a resistivity of at least 10 ohm/cm. or higher. The thin portions 6' of the gate were of intrinsic material of from 1 to 3 microns in thickness. The drain member 8 was of N-type silicon having about the same resistivity as the source-substrate region 2. It will be appreciated that the thickness of the drain region is not critical and may be less than 10 mils thick.

The device of FIGURE 7 may also be provided in the reverse polarity. That is, the gate 6, 6' may be composed of N-type material and the semi-insulator body 4, 4' of P-type material in which case the source and drain electrodes 2 and 8 would be composed of high conductivity P-type material. The gate contact region 10 would be of high conductivity N-type material.

While the drain electrode 8 has been described as being formed by diffusion, this is not the only way in which this electrode may be fabricated. Alternatively, it is possible to deposit a predetermined quantity of gold and antimony (say 1% antimony) on the surface of the semi-insulator body and to heat the assembly for a short time (say one or two minutes) at a temperature of from 300–500° C. so as to alloy the gold-antimony to the silicon material thus forming the high conductivity drain electrode 8. In some instances, this alloying technique may be preferred over diffusion because of the relatively short time required to form the alloy region in contrast to diffusion processes which often are long enough and of high enough temperatures to cause other regions of the device to undergo undesired further diffusion. While a grid of rectilinear geometry has been shown, it is not necessary that the grid shape be so restricted. In some instances, a grid formed so as to provide round or circular channels may be preferred.

The structures shown in FIGURES 7 and 8 permit one to make electrical connections to the gate 6, 6' and to the drain electrode 8 on the top surface of the device which is of extreme advantage in integrated circuitry. These electrical connections may be in the form of vapor-deposited metallic films. If desired, these deposited metallic layers may be insulated from any underlying electrode region except that to which it is desired to make the connection by an insulative layer of oxide, for example, of the semiconductor material as is well known in the art. Alternatively, connections to the gate contact region 10 and the drain electrode region 8 may be made by directly securing wires to these regions by thermo-compression bonding techniques or by soldering, or even pulse-bonding wires thereto.

While fabrication of the gate contact region 10 has been described by means of the diffusion process, this is not the only technique available for making this contact region. The gate contact region 12 may also be provided by deep alloying an opposite conductivity type-determining impurity to the semiconductor body 4' at an exposed top surface thereof after which a wire may be connected thereto as by pulse bonding, soldering or thermo-compression bonding techniques. It is also possible, providing the underlying gate electrode member 6, 6' is not at too great a depth beneath the surface of the semi-insulator body, to achieve the contact region 10 thereto by pulse bonding utilizing impurity-doped or coated wire as described in U.S. Patent 2,792,538 to W. G. Pfann.

Figure 9:
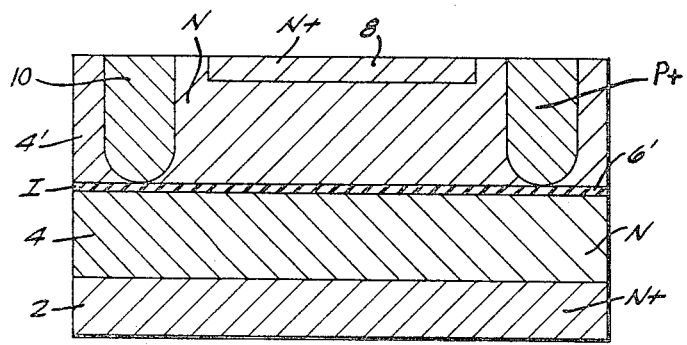
FIGURE 9 is a cross-sectional elevational view of another embodiment of a space-charge-limited current triode device according to the invention.

In FIGURE 9 another embodiment of the invention is shown wherein the gate electrode member 6' is formed by a layer of uniformly thin intrinsic silicon, for example. This arrangement may be achieved by epitaxially depositing a layer 6' of intrinsic silicon upon the N-type region 4 or by causing an out-diffusion of the N-type impurities from the surface portion of the N-type region 4. The triode device shown in FIGURE 9 will operate in substantially the same fashion as the device shown in FIGURES 7 and 8. That is, an appropriate signal applied to the planar gate electrode 6' will result in the widening of the depletion region associated with the gate electrode 6' so as to suppress the flow of space-charge-limited current from the source to the drain electrodes 2 and 8, respectively, through the gate member 6'.

Figure 10:
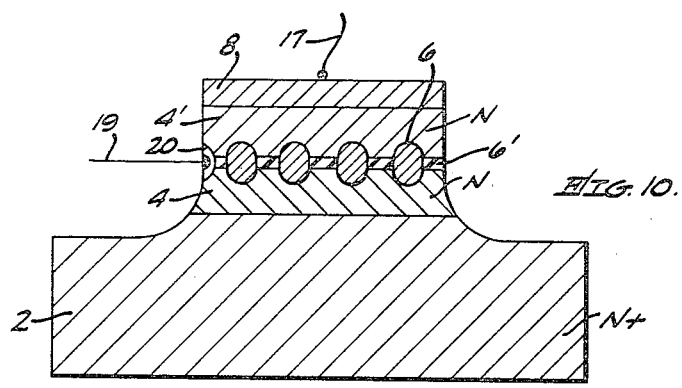
FIGURE 10 is a cross-sectional elevational view of a mesa-type space-charge-limited current triode device according to the invention.

In FIGURE 10 an embodiment of the invention in a mesa configuration is shown. This arrangement may be achieved, for example, by photo-resist and etching procedures so as to remove by etching all of the silicon material surrounding the gate and drain electrode regions 6, 6' and 8, respectively, down to the N+ substrate portion 2. In this manner, the semiconductor body 4, 4' is in the form of a mesa so that the gate electrode member 6, 6' is disposed within the mesa portion with the drain electrode 8 being disposed on top of the mesa. Electrical connections to the gate electrode member 6, 6' and to the drain electrode 8 may be made in one of several manners. As shown in the drawings, a wire 17 may be directly secured to the drain electrode member 8 by thermo-compression bonding techniques or by soldering or even pulse-bonding as is well known in the semiconductor art. Connection to the gate electrode member 6, 6' may be provided by alloying an acceptor conductivity type-determining impurity from the side of the mesa so as to form a P-type region 20 which extends laterally into the mesa to contact the gate electrode 6, 6'. Thereafter, a wire 19 may be secured to the P-type alloy region 20 by suitable techniques as suggested hereinbefore. It is also possible to eliminate the P-type alloy region 20 and pulse-bond an acceptor-coated or doped wire 19 to the side of the mesa and into the semiconductor body 4, 4' so as to contact the gate electrode member 6, 6'. This latter procedure has the advantage of providing the necessary connection in one step.

Figure 13:
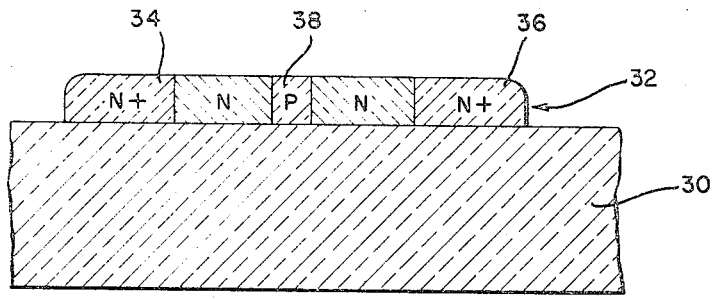
FIGURE 13 is a cross-sectional elevational view of another embodiment of a space-charge-limited triode device according to the invention in which the gate, drain and source regions are disposed laterally with respect to each other rather than vertically.
Figure 14:
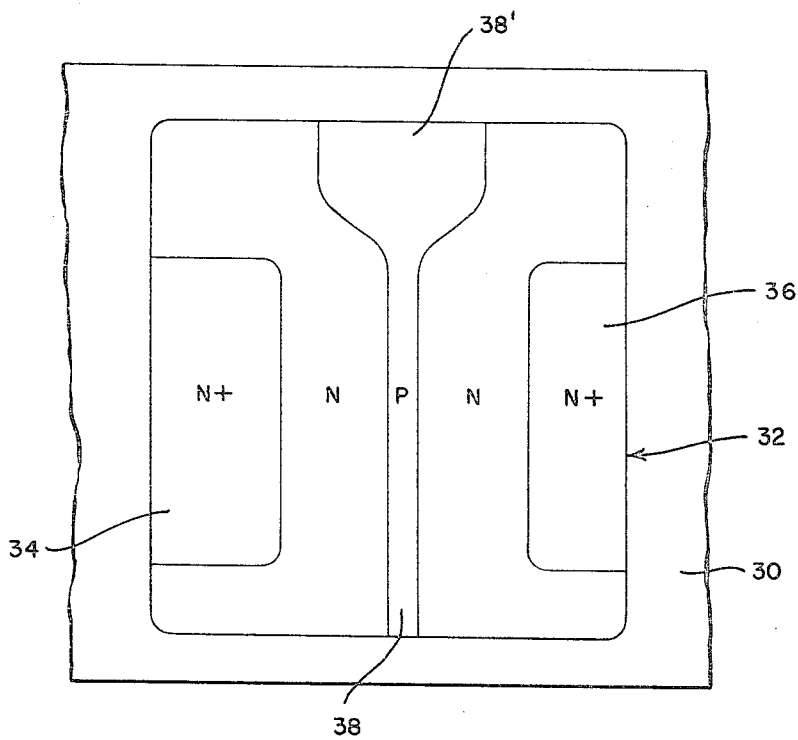
FIGURE 14 is a plan view of the field effect triode device shown in FIGURE 13.

In FIGURES 13 and 14, another embodiment of the space-charge-limited triode device is shown wherein the current flows laterally rather than vertically as described in connection with the preceding embodiments. This is achieved by arranging the gate, source and drain electrodes laterally (side by side) with the gate being separated from the source and drain regions by relatively high resistivity regions of opposite conductivity from that of the gate region. In this embodiment, it is necessary to form the space-charge-limited triode device on an insulating electrical substrate in order to prevent the various regions from being shorted to each other. Referring now to the drawings for details, a suitable insulating substrate 30 may be provided by sapphire ($Al_2O_3$) or any other similar material which is compatible with the formation of crystalline silicon or other semiconductor material thereon. The semiconductor device body 32 is formed on the substrate 30 by the well-known and previously referred to epitaxial process. As deposited by this process on the substrate 30, the silicon body 32 may be of a high resistivity N-type material of approximately 2 ohm-centimeters in resistivity. It may be necessary to first deposit a film of semiconductor material upon the entire surface of the substrate member and then subsequently etch the device body 32 out of the deposited film. By the oxide masking and diffusion techniques described previously, the source and drain regions 34 and 36 are formed, it being understood that these regions, due to the diffusion of an N-type impurity therein, are of lower resistivity than that of the N-type device body. Thereafter and again by the oxide masking and diffusion techniques referred to, a high resistivity P-region or gate 38 is formed in the center of the semiconductor body 32. As shown in FIGURE 14, the gate 38 as well as the source and drain regions 34 and 36 are so formed in the semiconductor body 32 as to permit a widened region 38' of P-type material to be disposed at one side of the device body 32 for the purpose of permitting an electrical connection to be made to the gate region 38. It will thus be appreciated that a lateral or side-by-side arrangements of the N+NPNN+ regions as described in connection with previous embodiments is provided. It will also be appreciated that the diffused N+ and P regions in the semiconductor film 32 are formed so as to extend substantially completely through the film to reach the insulating substrate 30 as best shown in FIGURE 13.

With reference to FIGURE 10, the basic relation for space-charge-limited currents derived by Mott-Gurney predicts the following current-voltage relation:

$$I = \frac{9\epsilon\epsilon_0\mu_o AV^2}{8L_o^3} \quad (1)$$

where $\epsilon\epsilon_o$ is the absolute dielectric constant, $\mu_o$ is the mobility of charge carriers, A is the area, and $L_o$ is the width of a device having a high resistivity region of one conducting type (i.e., "intrinsic" or P-type) sandwiched between adjacent high resistivity regions of opposite conductivity type (i.e., N-type). Without a connection to the intrinsic or P-type region, the structure may be viewed as a diode for the purposes of the present analysis.

If the thickness, $L_o$, of the diode is rather small at reasonable voltages, the region of field dependent mobility is reached and, according to Shockley (Bell System Technical Journal, vol. 30, p. 990, 1951), may be expressed through the relation $$\mu = \mu_o \left(\frac{E_c}{E}\right)^{1/2} = \mu_o \frac{E_c^{1/2} L_o^{1/2}}{V^{1/2}} \quad (2)$$

where E is the field established by the applied voltage and $E_c$ is a constant for silicon.

Substituting Equation (2) into Equation (1) yields the voltage-current relation of an SCLC diode as follows:

$$I = \frac{9\epsilon\epsilon_o\mu_o E_c^{1/2} AV^{3/2}}{8L_o^{5/2}} \quad (3)$$

In a more precise theoretical analysis, the numerical factor 9/8 is found to be $$\frac{2}{3}\left(\frac{5}{3}\right)^{3/2}$$

The voltage-current relation of the space-charge-limited triode of the present invention obeys the 3/2 power relation and the current is found to be inversely proportional to the 5/2 power of the length $L_o$.

Modulation of the space-charge-limited current is accomplished by applying a negative voltage, $V_{GS}$, between the gate (6,6′) and the source terminal (2). With reference to FIGURE 10, this negative voltage effectively widens the total space-charge region from $L_o$ to $$[L_o + L(V_{GS})]$$

where L is a function of $V_{GS}$. The complete functional relation of the drain voltage-current characteristic is then given by:

$$I_D = \frac{2}{3}\left(\frac{5}{3}\right)^{3/2} \frac{\epsilon\epsilon_o\mu_o E_c^{1/2} AV_D^{3/2}}{[L_o + L(V_{GS})]^{5/2}} \quad (4)$$

Since the gate-source PN-junction is close to a linear graded junction $L(V_{GS}) = aV_{GS}^{1/3}$, where $a$ is constant for a particular gradient and material, the amplification of the triode is characterized by its transconductance, which is equal to:

$$\frac{dI_D}{dV_{GS}}\bigg|_{V_D = \text{constant}} = g_m \quad (5)$$

and from Equation (4) by differentiation after $V_{GS}$ one obtains $$g_m = -\left(\frac{10}{18}\right)\left(\frac{5}{3}\right)^{3/2} aV_D^{3/2}[L_o + aV_{GS}^{1/3}]^{-7/2} V_G^{-2/3} \quad (6)$$

In a first order approximation, namely, for a $V_{GS}^{1/3} \ll L_o$, the transconductance has been found to be proportional to:

$$g_m \propto V_{GS}^{-2/3} \quad (7)$$

Figure 11:
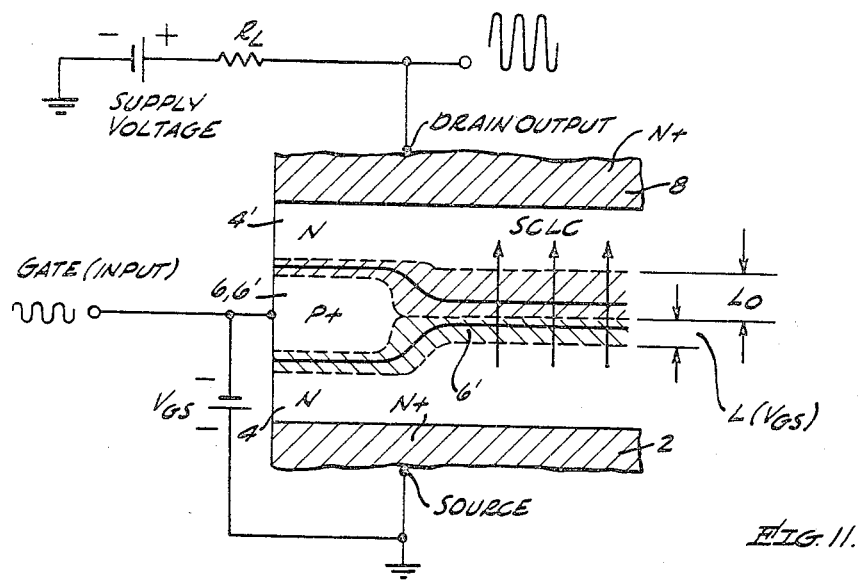
FIGURE 11 is a partially schematic and partially cross-sectional representation of a space-charge-limited current triode device according to the invention for explaining the characteristics and operation thereof.
Figure 12:
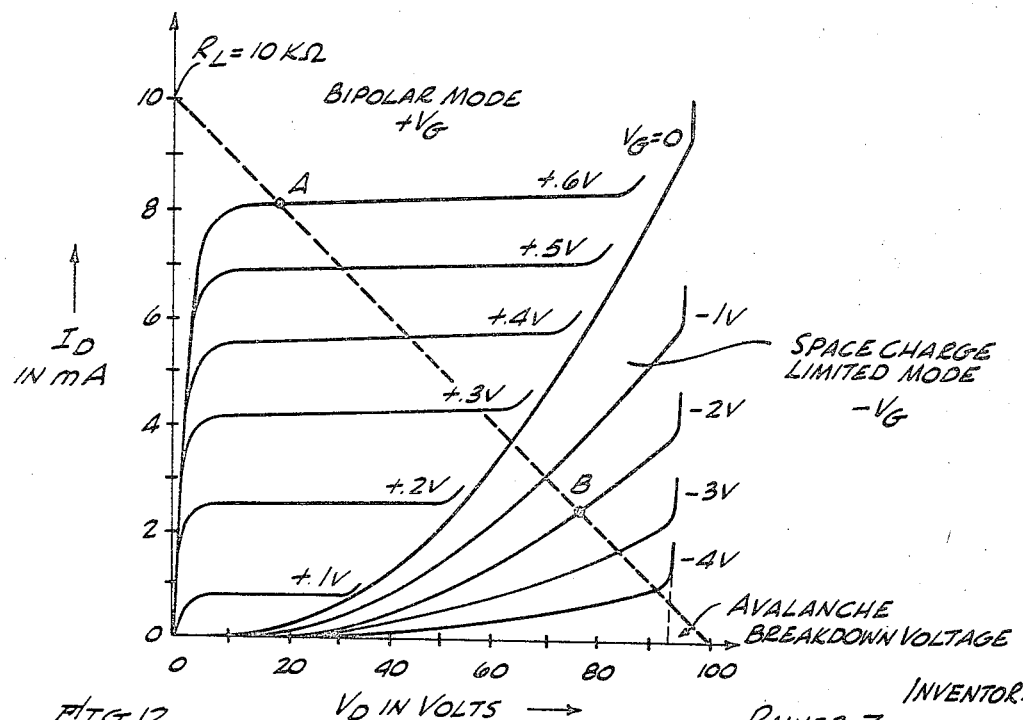
FIGURE 12 is a graph illustrating the voltage-current relationships of a space-charge-limited current device according to the invention for both the bipolar and the space-charge-limited current modes of operation.

Since the device of the present invention includes an NPN structure, it may be operated in two different modes: (1) as a space-charge-limited triode and (2) bipolar transistor simply by reversing the negative input voltage polarity to a positive one. The bipolar operation is only possible below the punch-through voltage, since beyond punch-through bipolar operation will cease. A typical load-line, where $R_L = 10K\Omega$, is shown in FIGURE 11 for the voltage-current characteristics of a typical device. By proper voltage signals, the device can be switched from operating point A, e.g., $V_G = +0.6V$ to operating point B, e.g., $V_G = -2V$. During this transition, the impedance levels of input and output are reversed. For the bipolar operation, the input resistance is in the range of several hundred ohms and the output differential resistance is in the range of several hundred kilo ohms, whereas in the space-charge-limited operation, the input resistance is very high and in the range of $10^6$–$10^8$ ohms with the output differential resistance being in the range of a few kilo ohms. The device can be used to switch linear signal amplification levels by applying various gate voltages.

The space-charge-limited triode of the present invention, in comparison with a vacuum tube triode, has a high input impedance. The control mechanism by means of voltage signals on the gate electrode member produces current variations which result in a transconductance or voltage amplification of practical ranges compatible with vacuum tubes in the range of 1,000–10,000 $\mu$mho's.

The device of the present invention is useful for high frequency oscillators and push-pull amplifiers. Since space-charge-limited current prevails, the current of the device has a smaller temperature dependence than a bipolar transistor. It also appears that the device will operate as a low noise amplifier, because the presence of the space-charge acts as a means for noise suppression.

What is claimed is:

1. A space-charge-limited current triode device comprising:
   (a) a body of semiconductor material having two regions of the same type of conductivity and of a resistivity greater than that of degenerative material;
   (b) a homogeneous gate layer of substantially intrinsic semiconductor material extending through said body immediately between and separating said two regions and joining said regions on opposite respective sides of said gate layer, and terminal means for electrical connection to said layer;
   (c) an electrically conductive source member in electrical contact with one of said two regions;
   (d) and an electrically conductive drain member in electrical contact with the other of said two regions.

2. The invention according to claim 1 wherein said source and drain members are provided by low resistivity regions in said body of semiconductor material.

3. The invention according to claim 1 wherein said same type of conductivity is N-type and said source and drain members are of N-type semiconductor material of lower resistivity than that of said regions.

4. A space-charge-limited current triode device comprising:
   (a) a body of semiconductor material having two regions of the same type of conductivity and of a resistivity greater than that of degenerative material;
   (b) a gate member comprising a layer of substantially intrinsic semiconductor material in contact with and connecting a plurality of spaced regions of semiconductor material of lower resistivity than said layer of intrinsic material, said spaced regions being thicker than said layer of said intrinsic material, said gate member extending through said semiconductor body immediately between and separating said two regions and joining said two regions on opposite respective sides of said gate member, and terminal means for electrical connection to said gate member;
   (c) an electrically conductive source member in electrical contact with one of said two regions;
   (d) and an electrically conductive drain member in electrical contact with the other of said two regions.

5. The invention according to claim 4 including electrical connection members affixed respectively to said gate member and at least said drain member.

6. The invention according to claim 4 wherein said source and drain members are provided by low resistivity surface portions on opposite sides of said semiconductor body.

7. The invention according to claim 4 wherein said terminal means to said gate member comprises a low resistivity region in said semiconductor body extending therethrough and from a surface thereof to said gate member and being of the same type of conductivity as said gate member.

References Cited

UNITED STATES PATENTS

| | | | |
|---|---|---|---|
| 2,790,037 | 4/1957 | Shockley | 317—235 |
| 2,968,750 | 1/1961 | Noyce | 317—235 |
| 2,983,853 | 5/1961 | Williams | 317—234 |
| 3,252,003 | 5/1966 | Schmidt | 317—235 |
| 3,293,087 | 12/1966 | Porter | 317—235 |

FOREIGN PATENTS

| | | |
|---|---|---|
| 948,239 | 1/1964 | Great Britain. |

JAMES D. KALLAM, *Primary Examiner.*